(12) United States Patent
Cheng et al.

(10) Patent No.: US 10,977,756 B2
(45) Date of Patent: Apr. 13, 2021

(54) LOCATION BASED QUALITY ASSURANCE SYSTEM

(71) Applicant: Infotronic Technology Limited, Hong Kong (HK)

(72) Inventors: Kwong Yip Cheng, Hong Kong (HK); Kam Chuen Yeung, Hong Kong (HK); Wai Kei Leung, Hong Kong (HK); Kwok Shing Leung, Hong Kong (HK)

(73) Assignee: Infotronic Technology Limited, Hong Kong (HK)

( * ) Notice: Subject to any disclaimer, the term of this patent is extended or adjusted under 35 U.S.C. 154(b) by 97 days.

(21) Appl. No.: 16/309,444

(22) PCT Filed: Oct. 12, 2016

(86) PCT No.: PCT/IB2016/056095
§ 371 (c)(1),
(2) Date: Dec. 12, 2018

(87) PCT Pub. No.: WO2017/216618
PCT Pub. Date: Dec. 21, 2017

(65) Prior Publication Data
US 2019/0333178 A1 Oct. 31, 2019

(30) Foreign Application Priority Data
Jun. 13, 2016 (HK) .................................. 16106796.5

(51) Int. Cl.
*G06Q 50/26* (2012.01)
*H04W 4/029* (2018.01)
*G06Q 30/00* (2012.01)
*H04W 88/16* (2009.01)

(52) U.S. Cl.
CPC ........ *G06Q 50/265* (2013.01); *G06Q 30/018* (2013.01); *H04W 4/029* (2018.02); *H04W 88/16* (2013.01)

(58) Field of Classification Search
CPC .................... G08B 13/196; G06Q 10/063114
See application file for complete search history.

(56) References Cited

U.S. PATENT DOCUMENTS

2014/0354820 A1* 12/2014 Danialian ............ G08B 13/196
348/154
2014/0365259 A1* 12/2014 Delplace ........ G06Q 10/063114
705/7.15

FOREIGN PATENT DOCUMENTS

CN 104932360 A * 9/2015 ........... G06B 19/042

\* cited by examiner

*Primary Examiner* — John R Wallace

(57) ABSTRACT

A location based Quality Assurance System and a method to collect data in work spaces in terms of locations, environment conditions, time, workers and behaviours, thru the wireless interactions (M2M) of located and installed sensors on sites and PPE with detachable or built-in sensors, which data wirelessly transmitted to remote servers for big data analysis in order to enhance effective communication and management of safety, work flow, work forces, worker attendance and project in work spaces.

10 Claims, 8 Drawing Sheets

US 10,977,756 B2

LOCATION BASED QUALITY ASSURANCE SYSTEM

FIELD

The present disclosure relates to a location based safety and quality assurance system and defect management system, and a method to collect data in relation to locations, environment conditions, time, workers/personnel and behaviours in a work space of different industries including but not limited to a construction site.

BACKGROUND

In large-scale real estate projects, there are hundreds of defects in construction work and existing buildings that need to be corrected, and the elimination of such defects needs to be monitored systematically.

Defects have been collected and documented in most construction and real estate enterprises with the aid of conventional media such as dictaphones, photos and Excel files or even by means of especially developed access databases or manual notes on printed CAD drawings. Thousands of photos and descriptions of defects as well as their gradual elimination have to be manually collated and systematised.

This conventional procedure is very time-consuming and the risk of errors is very high. One quickly loses track of the overall situation and the result may be documentation that is not legally compliant.

Then there is the question of where the defects were recorded. Localization/location tagging is often difficult.

In addition, there will exist one or more danger zones in a work place or space, the indication and/or management of the same is also a serious but hard to solve problem. In general, complete elimination of danger zones is not possible due to the nature of activities being conducted, thereby there is a need to manage the danger zones by alerting/restricting unauthorized persons to approach or access the danger zone, and only authorized workers/personnel with competent credentials and carried with suitable equipment should be allowed to approach or access the same during a predetermined period.

DISCLOSURE

There is disclosed a location based quality assurance system adapted for defect management and environment management/monitoring; and a method to collect data in relation to locations, environment conditions, time, workers/personnel and behaviours in a work space including a construction site by adopting the foregoing location based quality assurance system according to various embodiments as will be described in details hereunder, wherein data are collected and transmitted thru wireless machine to machine (M2M) interactions or communication of locator units, mobile and/or installed sensors and gateways, and personal protective equipment with detachable and/or built-in sensors; and collected data are wirelessly transmitted to the remote server for timely or real time work process administration and/or big data analysis in order to enhance effective communication and management of safety, work flow, work forces, worker/personnel behaviour and/or attendance and projects in the work space.

FIGURES

The disclosure will be described by way of example with reference to the accompanying Figure, in which.

DESCRIPTION

The present disclosure provides a location based Quality Assurance System and relevant methods for implementing the same, as will be described in further details hereunder.

Location Based Quality Assurance System and Method for Construction Site

The present disclosure relates to a system and method to collect data in work space including construction sites in relation to locations, environment conditions, time, workers/personnel and behaviours thereof; wherein the collection of data is conducted thru the wireless interactions (M2M) of located and installed sensors on sites and personal protective equipment (PPE) with detachable and/or built-in sensors, and wherein the data are wirelessly transmitted to remote servers for timely or real time work process administration and/or big data analysis in order to enhance effective communication and management of safety, work flow, work forces, worker/personnel attendance and project in work spaces/construction sites.

Figure 1:
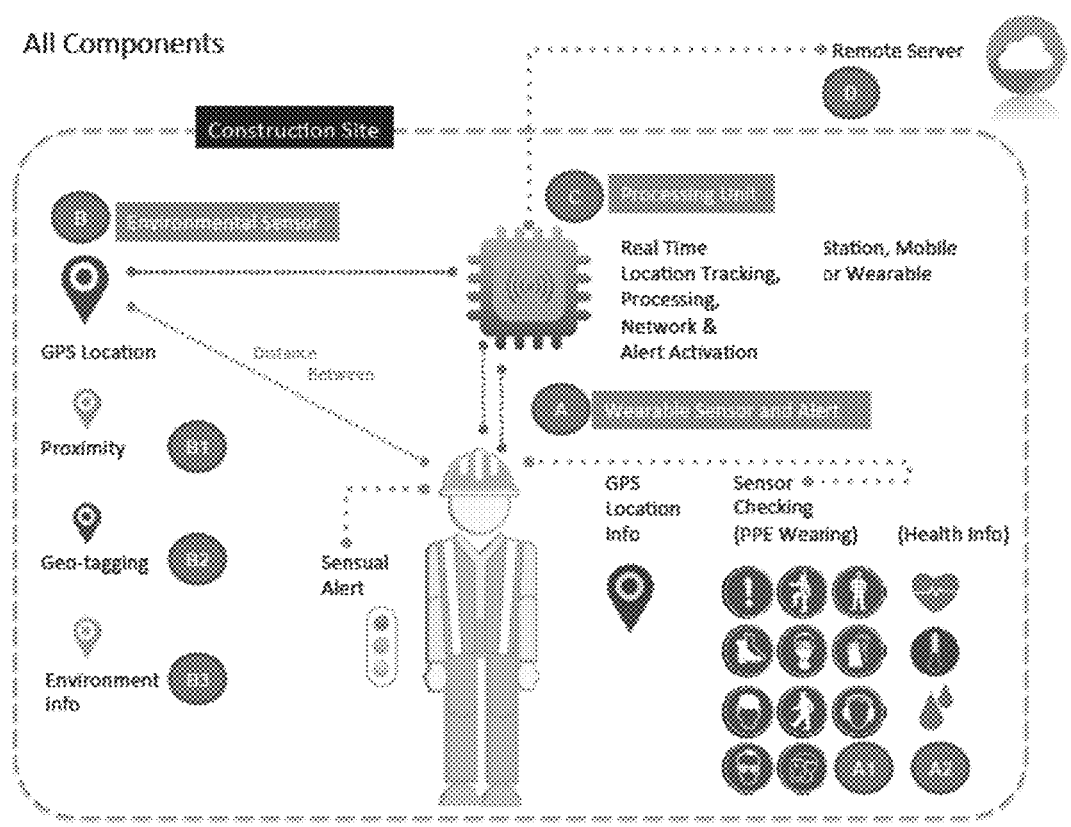
FIG. 1 is a schematic view of example components used in an example location based Quality Assurance/Control System.

Referring to FIG. 1, which is a schematic view of example components used in an example location based Quality Assurance/Control System.

In some embodiments, the system comprises a plurality of sensors located or installed for providing indoor and/or outdoor location references; and a plurality of sensors located or installed for collecting environmental information; wherein the integration of location references or information of the located and installed sensors is to provide a 2D and/or 3D zoning of indoor and/or outdoor environment of one or more sites. The M2M interfaces are provided between all sensors and other various devices on sites; wherein some of sensors are attached in a detachable manner or built-in to PPE (to be wore by workers or visitors to the sites) to monitor the proper manipulation of the equipment; and the system includes various wearable or portable devices to collect data from and response to the installed sensors and transmit the data to remote servers, thru wireless networks (preferably long haul wireless network and mobile wireless network, such as 3G/4G/5G or wifi, or the like). In the example system of the present disclosure, proper manipulations of PPE are evaluated according to location and environmental conditions; and improper uses will be noticed to the workers or visitors wearing the PPE and relevant data will be transmitted to the remote and preferably cloud servers via the wireless networks; wherein the data are collected and analysed according to the locations, environment conditions, time, workers and behaviours thereof. The analysed data will help effective management of safety, work flow, worker attendance management in construction sites.

In some embodiments, the system comprises one or more of the following features:
  Connected PPE featuring wireless transmissions, preferably mobile wireless transmissions, short range wireless transmissions and BLE (Bluetooth Low Energy) transmissions, various connected sensors (for various PPE), various alerts for wearer/worker, relatively low power consumption, relatively long battery life (>1 year);
  Wearable/Wearing Gateway featuring wireless transmissions, preferably mobile wireless transmissions, short range wireless transmissions and BLE transmissions, iBeacon and/or EddyStone Compatible module, 3G and/or Wifi module/capabilities, GPS module, small display/screen (optional), built-in App and computing power, light in weight (~50 g), wearable or attachable for mobile application, one day or above battery life;
  Warning and/or Active Locators featuring wireless transmissions, preferably mobile wireless transmissions, short range wireless transmissions and BLE transmissions, iBeacon and/or EddyStone protocol/module, built-in various sensors, very low power consumption, long battery life (>2 years), medium in size, weather proof design;
  Landmark Hub/Installed Gateway featuring wireless transmissions, preferably mobile wireless transmissions, short range wireless transmissions and BLE transmissions, iBeacon and/or EddyStone Compatible module, 3G and/or Wifi module/capabilities, GPS module, small display/screen (optional), built-in App and computing power, dual (AC/DC) powered, pluggable to bulb socket;
  Digital Landmark featuring wireless transmissions, preferably mobile wireless transmissions, short range wireless transmissions and BLE transmissions, iBeacon and/or EddyStone protocol/module, optional various sensors, very low power consumption, long battery life (>2 years), weather proof design; and
  Wireless preferably BLE+GPS card/module featuring wireless transmissions, preferably mobile wireless transmissions, short range wireless transmissions and BLE transmissions, iBeacon and/or EddyStone Compatible module, GPS module, light weight (~30 g), thin and small in size, three days or above battery life.

In some embodiments, the PPE comprises a full body harness, a welding mask, a spray mask, a smoke mask, a dusk mark, a fire mask, a protective mask, a protective boot, a protective suit, a protective glove, a protective glass, an anti-noise headphone, and/or a safety helmet, being capable of checking whether buckets and clips are used and/or worn properly; providing location aware checking or activation, and alerts to users if negative or upon specific situations; and providing real time status update to remote/cloud server. The PPE employs wireless protocol and preferably mobile wireless protocol and BLE for communications with locators, hub, mobile device, and/or landmarks; GPS for outdoor positioning; WiFi and 3G for data network; LED indicator for alerts; optional connector for connection with external wireless module/card such as BLE+GPS card; embedded system for processing of data (with chips and memory); and it has a signal/communication coverage of a working radius of 50 m to 70 m with a positioning data accuracy or tolerance of 1 m, a working temperature range from −20° C. to +60° C., and humidity range from 0% up to 100%, and IP rate of IP-54 or above; and it could be preferably powered by a rechargeable battery which could last for one day or above per charge. To this end, the PPE might comprise one or more of the following component operatively connected with each other: sensors for bucket and clip (and/or helmet wearing) checking; wireless module and preferably mobile wireless module and BLE module; GPS module, WiFi and/or 3G module; processor, memory, and RAM; optional connector for external BLE+GPS card; rechargeable battery; rapid charging mechanism; and USB interface for services.

In some embodiments, the Hub/Installed Gateway is configured to locate or communicate with all wireless cooperative devices such as BLE devices (landmark, locator, BLE+GPS card and connected PPE); it monitors all wireless cooperative devices such as BLE devices; activates alerts to particular connected PPE as location contextual warning; acts as WiFi extender and/or smart lighting switch; and provides real time status to remote/cloud servers. The Hub/Installed Gateway employs wireless protocol such as BLE for communications to all wireless cooperative devices such as BLE devices; GPS for outdoor positioning; Geo-tagging (scheme with preset or configurable positioning data) for indoor positioning; WiFi and 3G for data network; embedded system for processing (with chips and memory); AC/DC power supply; optional battery operation; optional rechargeable battery for backup. To this end, the Hub might comprise one or more of the following component operatively connected with each other: wireless module and preferably mobile wireless module and BLE module; GPS module, WiFi and/or 3G module; processor, memory, and RAM; optional AC/DC power plug (TBC); extended antenna; optional rechargeable battery; rapid charging mechanism; and USB interface for services.

In some embodiments, the Wearable/Wearing Gateway is configured to locate or communicate with all wireless cooperative devices such as BLE devices (landmark, locator, BLE+GPS card and connected PPE); it monitors all wireless cooperative devices such as BLE devices; activates alerts to particular connected PPE as location contextual warning; acts as WiFi extender and/or smart lighting switch; and provides real time status to remote/cloud servers. The Wearable/Wearing Gateway employs wireless protocol such as BLE for communications to all wireless cooperative devices such as BLE devices and GPS for outdoor positioning; receives and computes data from landmarks for indoor positioning; uses WiFi and 3G for data network; includes embedded system for processing (with chips and memory); and it could be preferably powered by a rechargeable battery which could last for one day or above per charge. To this end, the Wearable/Wearing Gateway might comprise one or more of the following component operatively connected with each other: wireless module and preferably mobile wireless module and BLE module; GPS module, WiFi and/or 3G module; processor, memory, and RAM; optional extended antenna; rechargeable battery; rapid charging mechanism; and USB interface for services.

In some embodiments, the wireless preferably BLE+GPS card/module is configured to provide GPS location/positioning data, transmit positioning data to HUB or mobile devices, and use NFC smart card for identification. The BLE+GPS card/module employs wireless protocol such as BLE for communications with locators, hub, mobile device, and/or landmarks; GPS for outdoor positioning; WiFi and 3G for data network; connector for connection with PPE for power; optional battery (preferably rechargeable) for functioning without connection with PPE; and it might has a signal/communication coverage of a working radius of 50 m to 70 m with a data accuracy or tolerance of 1 m. To this end, the BLE+GPS card/module might comprise one or more of the following component operatively connected with each other: wireless module and preferably mobile wireless module and BLE module; GPS module; NFC smart card module; and optional rechargeable battery.

In some embodiments, the Digital Landmark is configured to have a preset and remotely configurable address of 2D and/or 3D coordinates, and the landmark broadcasts the preset address to HUB and mobile devices for provision of a room scale positioning data. The Digital Landmark employs wireless protocol such as BLE for communications with locators, hub, mobile device, and/or landmarks; Geotagging (scheme with preset or configurable positioning data) for indoor positioning; replaceable alkaline battery having a two year working life; optional rechargeable battery for extended working life; and it might has a signal/communication coverage of a working radius of 50 m to 70 m with a data accuracy or tolerance of 1 m. To this end, the Digital Landmark might comprise one or more of the following component operatively connected with each other: wireless module and preferably mobile wireless module and BLE module; alkaline battery; and optional rechargeable battery.

In some embodiments, the Warning Locator, preferably in form of a traffic cone, is configured to locate or communicate with all wireless cooperative devices such as BLE devices (landmark, BLE+GPS card and/or connected PPE) within a specific range; it monitors all wireless cooperative devices such as BLE devices; activates alerts to particular connected PPE as location contextual warning; provided an optional flash light alerts to people nearby; and provides real time status to remote/cloud servers. The Warning Locator employs wireless protocol such as BLE for communications to all wireless cooperative devices such as BLE devices and GPS for outdoor positioning; adopts proximity sensors for indoor positioning; uses WiFi and 3G for data network; includes embedded system for processing (with chips and memory); and it could be preferably powered by a rechargeable battery or normal alkaline battery which could last for months. To this end, the Warning Locator might comprise one or more of the following component operatively connected with each other: wireless module and preferably mobile wireless module and BLE module; GPS module; WiFi and/or 3G module; processor, memory, and RAM; alkaline battery; optional rechargeable battery; optional rapid charging mechanism; and USB interface for services.

In some embodiments, the Active Locator is configured to provide proximity alerts to PPE located nearby and GPS outdoor location data to HUB and mobile devices; and broadcast optional environmental information to HUB and mobile devices (with extra and specific sensors installed); and indicate HUB to activate alerts to users within designated range. The Active Locator employs wireless protocol such as BLE for communications to all wireless cooperative devices such as BLE devices (such as Hub and mobile devices) and GPS for outdoor positioning; and it might has a signal/communication coverage of a working radius of 50 m to 70 m with a data accuracy or tolerance of 1 m; and it could optionally uses WiFi and 3G for data network; and might include embedded system for processing (with chips and memory); and it could be preferably powered by a rechargeable battery or normal alkaline battery which could last for years, and provided with optional extra sensors for sensing various data. To this end, the Active Locator might comprise one or more of the following component operatively connected with each other: wireless module and preferably mobile wireless module and BLE module; GPS module, optional WiFi and/or 3G module; optional processor, memory, and RAM; alkaline battery; optional rechargeable battery; optional rapid charging mechanism; and USB interface for services; and optional external/internal sensors for sensing predetermined data.

In some embodiments, the location based quality assurance system is deployed or installed in a work space such as a construction site. The PPE and wearable gateway might be wore or carried by a worker/personnel to enable proper user identification and job assignment, and multiple digital landmarks and installed gateways might be mounted at various locations in the construction site to enable the provision of relatively accurate indoor and/or outdoor positioning data. The warning and/or the active locators are mounted at specific locations or deployed within a specific zone to alert the worker when the worker is passing by or approaching to the specific locations or zone. The positioning data of all components of the system are transferred to, stored and made used by the remote/cloud server for timely or real time work process administration and/or big data analysis in order to enhance effective communication and management of safety, work flow, work forces, worker attendance and project in the construction site.

Referring to FIGS. 2-8, which depict various flow charts for various methods of the present disclosure, wherein the term or feature "BLE" or "wireless transmission" provided herein denote all applicable wireless protocol/transmissions, and the term "work space" and "construction site" include and denote work space of different industries, construction site, structure, building (during construction or completed), or the like, whether under construction or completed; while the term "danger zone" shall denote any specific region or area in all applicable work places or spaces with which a device or element (e.g. vehicle, machines, object with sharp ends, flammable matters, toxic fluid/gas source or containers, highly polluted area or substances, or the like) of hidden hazard is associated, such that a safety clearance should be kept and notified to any nearby worker or personnel, so as to remind the need for equipping one or more PPEs, and the danger zone might be selectively delimited or indicated with one or more traffic cones, cordons, colourful bands, ropes, nets, or even walls, or other means well known in the art; wherein the method adopts a location based quality assurance system, comprising:

one or more locator units, preferably in form of a standalone fastener and/or a traffic cone mountable at a designated indoor/outdoor position, with a preset or configurable locator data/first positioning data, and/or at least one sensor, and capable of broadcasting/providing the locator/first positioning data preferably by wireless transmission for provision of a 2D and/or 3D geo-tagging reference for positioning/indoor positioning of an external device within a predetermined coverage;

at least one movable and wearable personal protective unit, preferably in form of a safety helmet, a welding mask, a spray mask, a smoke mask, a dusk mark, a fire mask, a protective mask, a protective boot, a protective suit, a protective glove, a protective glass, an anti-noise headphone, and/or a full body harness, with at least one sensor and alert/status indicator for checking/receiving and indicating an operation or status or alert on at least one part of the personal protective unit and capable of broadcasting/providing GPS/second positioning data preferably by wireless transmission for provision of a location aware checking reference for an external device within a predetermined coverage;

at least one gateway unit, preferably in form of a portable electronic device, a smartphone, a handheld computer, and/or a bulb shaped device pluggable to bulb socket, operatively connected to the locator unit and the personal protective unit, and adapted to receive the locator/first positioning data and the/second positioning data and/or the references and compute a combined/third positioning data for generation of a location based output; and/or control the sensor and indicator based on the locator data and the positioning data; and/or send the location based output generated based on the locator/first positioning data, the second positioning data and/or the third positioning data to an external remote and preferably cloud server for further processing wherein the server is configured to operatively connected to and communicate with the locator unit and the personal protective unit and the gateway unit, so as to enable direct or indirect remote manipulation or control of the positioning data, the sensor, the indicator, and/or the location based output of the respective units.

In FIGS. 2-8, the locator unit is denoted or abbreviated as "L" while specific type of locator unit, such as a danger locator or a smart danger locator is denoted or abbreviated as "D"; the wearable personal protective unit, such as a helmet, a full body harness, or the like, is denoted or abbreviated as "P" or "H"; and the gateway unit (both mobile and stationary version) is denoted or abbreviated as "G".

In some embodiments, the locator unit is configured to comprise a proximity sensor for detecting proximity of the personal protective unit and and/or the gateway unit and to send actively an alert message to each of the detected personal protective unit and/or the gateway unit to notify them existence of a hidden danger and/or need of keeping a specific distance from a designated zone/area.

In some other embodiments, the one or more locator units and/or the at least one gateway unit are arranged to be aligned substantially along a length direction, a width direction, and/or a height direction of a site or building in which the locators units are mounted, so as to establish a 2D (including xy, yz, zx planes)/3D (including xyz plane) Geo-tagging system to enable provision of 2D/3D positioning data.

In some embodiments, the locator units is configured to be weather proof and powered by an internal chargeable battery, and support wireless transmission/transactions and iBeacon protocol, and comprise a plurality of sensors for sensing temperature, lighting, specific gas concentration, movement, and/or proximity of surrounding environment or objects.

According to the present disclosure, there discloses a method for collecting data in relation to locations, environment conditions, time, workers/personnel and behaviours in a construction site by adopting any one of foregoing systems, wherein data are collected and transmitted thru wireless machine to machine interactions of locator units, mobile and/or installed sensors and gateways, and personal protective equipment with detachable and/or built-in sensors; and collected data are wirelessly transmitted to the remote server for timely or real time work process administration and/or big data analysis in order to enhance effective communication and management of safety, work flow, work forces, worker/personnel attendance and projects in the construction site; the method comprises steps of:

a) arranging a plurality of first locator units with respective preassigned device ID in predetermined locations in the construction site to form a 2D and/or 3D network for provision of a 2D and/or 3D geo-tagging reference for positioning by broadcasting positioning data of 3D coordinates;

b) equipping each of workers with a preassigned personal protective unit capable of acquiring and broadcasting positioning data of 2D coordinates and/or a preassigned gateway unit with respective preassigned device ID capable of computing a combined positioning data for generation of a location based output based on the positioning data of 3D coordinates acquired from each of nearby and detected locator units and the positioning data of 2D coordinates acquired from each of nearby and detected personal protective units and sending the location based output to a remote server for big data analysis;

c) arranging a plurality of first gateway units with respective preassigned device ID fixedly in predetermined locations in the construction site to interact with each of the nearby and detected locator units, personal protective unit and gateways arranged at respective workers and sending data acquired from them and/or generated during interaction with them to the remote server for big data analysis; and preferably, the method might further comprise the following step:

d) arranging at least one second locator unit having a preassigned device ID and incorporated with a gateway unit or have capabilities of a gateway unit in predetermined locations in the construction site as a deployable active danger locator unit for indication of a configurable danger zone with a preset safety clearance, wherein the active danger locator unit periodically scan its coverage area and sends, when it detected a personal protective units and/or a gateway unit equipped by a worker and the detected personal protective unit and/or the gateway unit being approached to or located within the safety clearance, alert directly to the detected personal protective unit and/or the gateway unit and the alert is preferably also recorded and showed in the server until the detected personal protective unit and/or the gateway unit equipped by the worker being no longer located within the safety clearance.

In some embodiments, the foregoing method is adaptively revised or modified to solve various problems found in or to implement various technical solutions devised for a construction site, and some of the modified methods are described below with reference to the accompanying drawings.

Figure 2:
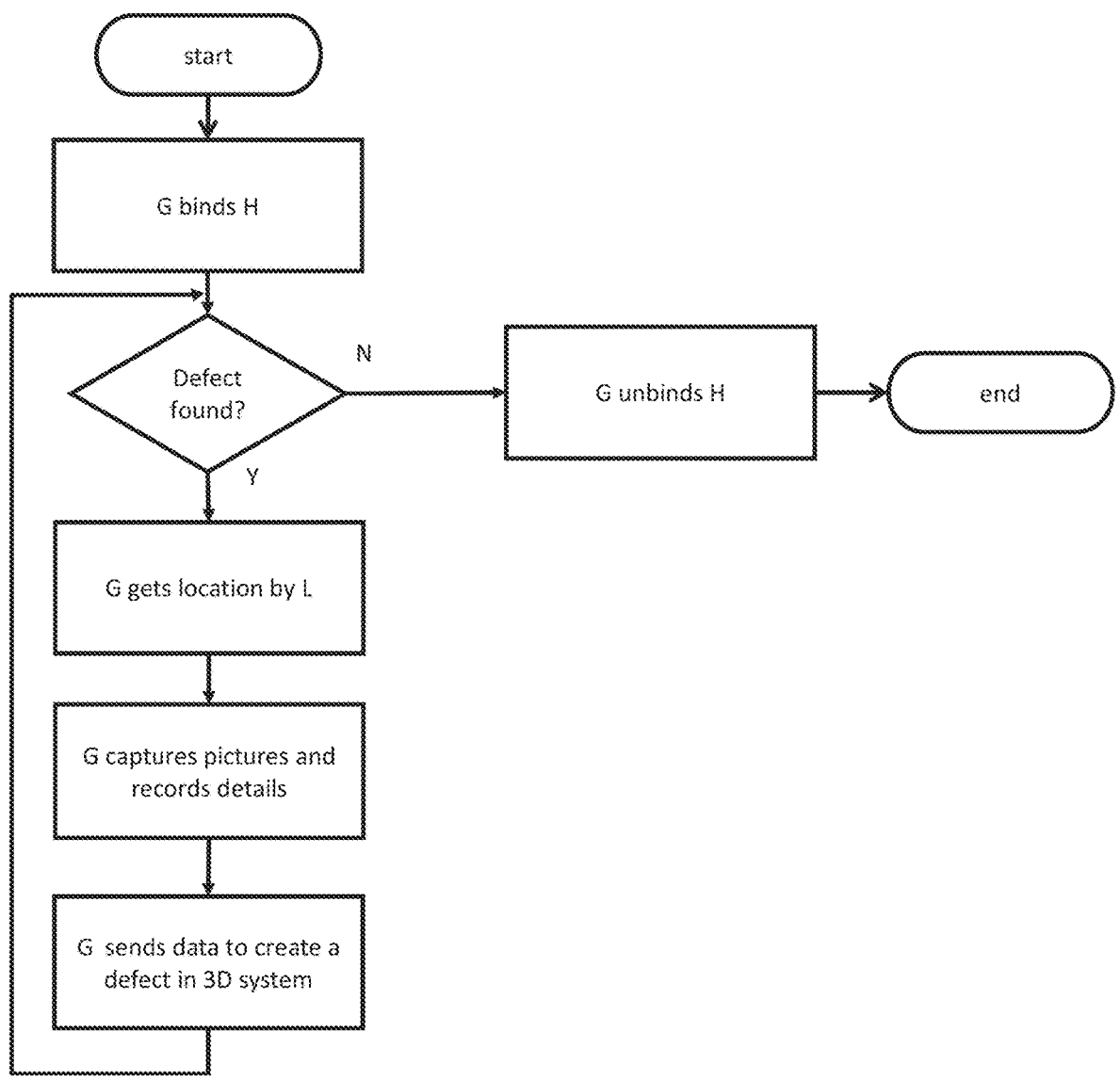
FIG. 2 is a flow chart of an example method of Defect Capturing of the present disclosure.
Figure 3:
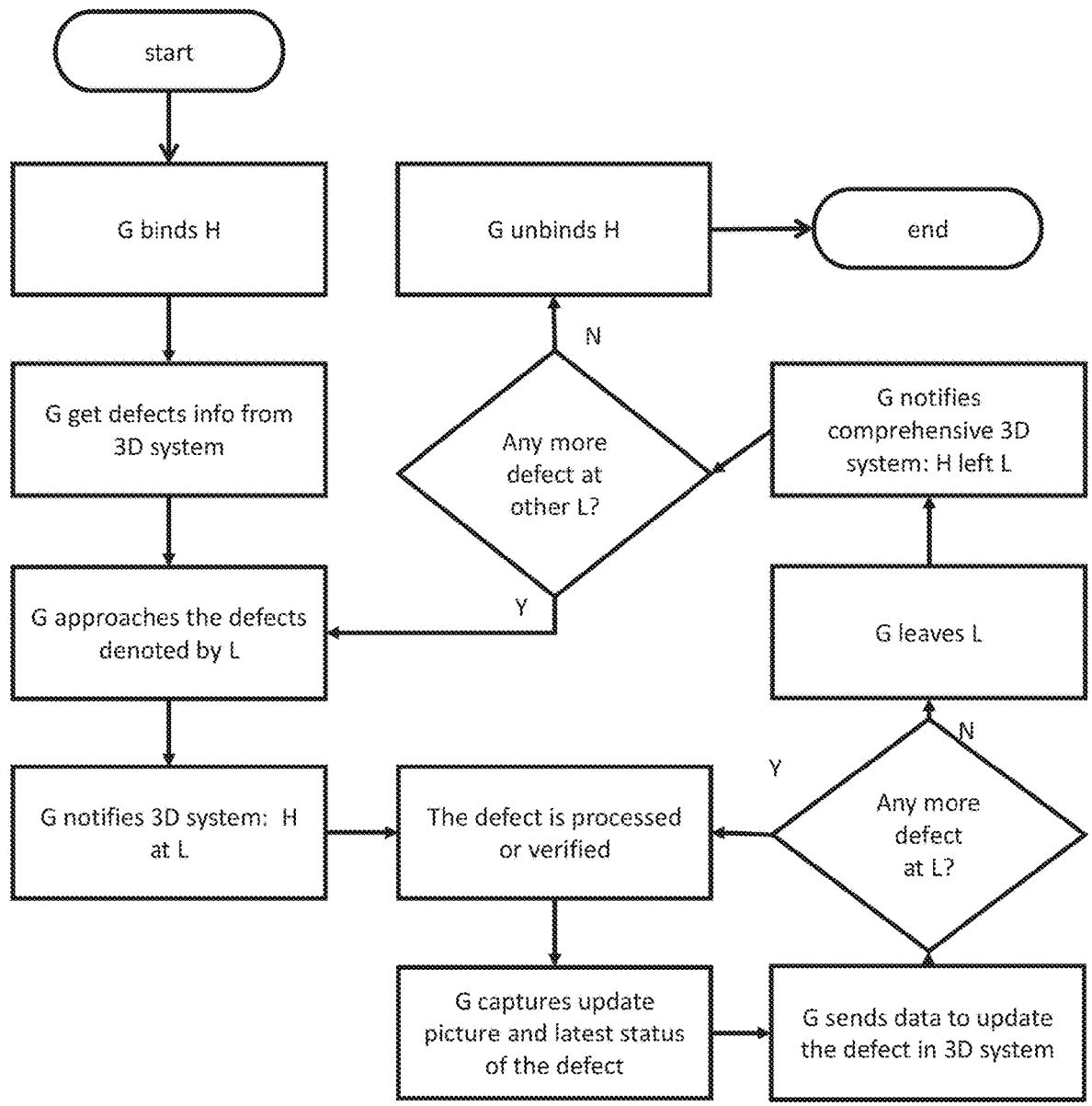
FIG. 3 is a flow chart of an example method of Defect Tracking and Verification of the present disclosure.

Referring to FIGS. 2-3, which depicts a flow chart of a method for defect management in a construction site adopting a foregoing system, wherein the one and more locator units (L) are arranged in the construction site and the personal protective unit (H) and the gateway unit (G) are equipped by each of workers for dealing with defects existed in the construction site, the method comprises a step for defect capturing further comprising substeps of:

a) connecting a first gateway unit with a first personal protective unit of a first worker assigned for site exploration and defect capture to acquire the GPS/second positioning data;

b) connecting, when a defect is found, the first gateway unit with one of the/a first locator units located nearby the defect to acquire the locator/first positioning data;

c) recording details of the defect with the first gateway unit and generating and sending a respective location based output denoting an exact location of the defect and incorporating the details of the defect to the server; and d) repeat steps b)-c) until all defects existed in the construction site have been recorded and received by the server;

wherein the method preferably comprises also a step for defect tracking, processing and verification further comprising substeps of:

e) connecting a second gateway unit with a second personal protective unit of a second worker assigned for defect tracking, processing and verification;

f) getting and downloading the respective location based output from the server to the second gateway unit for locating and reaching the respective locator unit and/or the respective defect to allow the respective defect to be processed or verified;

g) recording latest processing result and/or status data of the respective defect with the second gateway unit and sending recorded data to the server which updates latest status of recorded defects; and h) repeat steps f)-g) until all defects have been processed or verified and updated by the server.

In some embodiments, the foregoing method as illustrated by the FIG. 2 might comprise one or more of the followings:

201. The gateway unit (G) will bind with personal protective unit (H) to obtain the information of the worker/personnel.

202. When the worker/personnel with personal protective unit (H) arrived workspace with locator unit (L), if no defect found in the workspace (L), the gateway unit (G) will unbind with H and finish the process. When the worker/personnel found the defect in the workspace with locator unit (L). The gateway unit (G) will get the location information from the locator unit (L).

203. The worker/personnel will capture the pictures and record the defect's details by use of gateway unit (G).

204. The worker/personnel will send the data to create a defect record point in the 3D system by use of gateway unit (G).

205. Then steps from step 202 will be restart again.

In some embodiments, the foregoing method as illustrated by the FIG. 3 might comprise one or more of the followings:

301. The gateway unit (G) will bind with personal protective unit (H) to obtain the information of the worker/personnel.

302. The gateway unit (G) will obtain defects information from the 3D system.

303. When gateway unit (G) approaches the defects which is denoted by locator unit (L)

304. Then gateway unit (G) will notify the 3D system that the worker/personnel with personal protective unit (H) arrived at area of location unit (L).

305. The worker/personnel will check the defect is processed or verified.

306. The worker/personnel will capture picture of defect, the most update picture and status of the defect will update by use of gateway unit (G).

307. The updated data will be updated the defect information in the 3D system by use of gateway unit (G).

308. If there are another defect at area of location unit (L), the steps from step 305 will be restarted again. But if there are no more defect at area of location unit (L), the worker/personnel with personal protective unit (H) and gateway unit (G) will leave area of location unit (L).

309. Then gateway unit (G) will notify the 3D system that the worker/personnel with personal protective unit (H) leaved area of location unit (L).

310. Gateway unit (G) will check with the 3D system that any other defect at another location unit (L). If there are other defects at another location unit (L), then steps from step 305 will be restarted again.

311. Otherwise, gateway unit (G) will unbind with personal protective unit (H) and finish the process.

Figure 4:
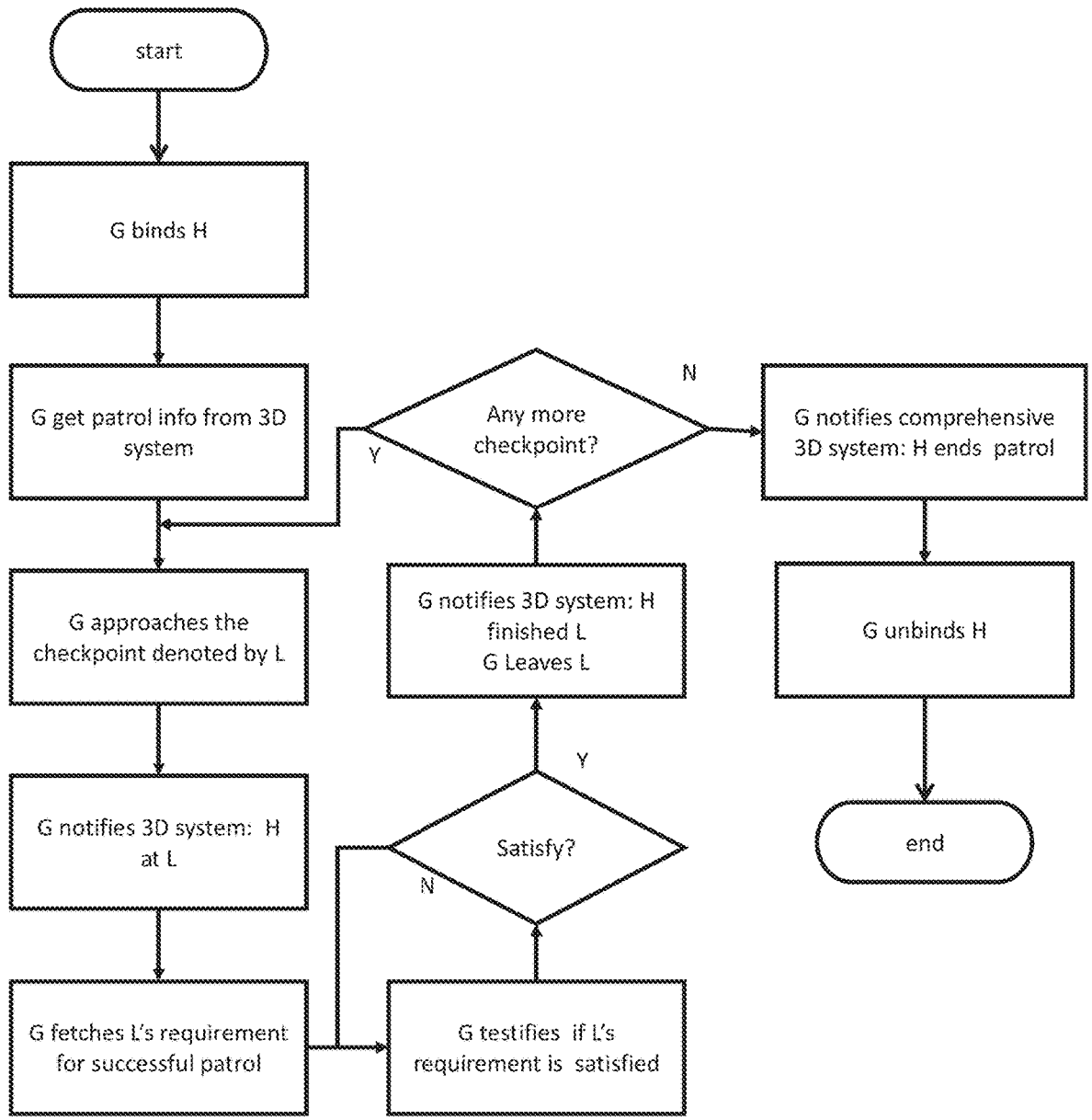
FIG. 4 is a flow chart of an example method of Safety Patrolling of the present disclosure.

Referring to FIG. 4, which depicts a flow chart of a method for safety patrolling in a construction site adopting a foregoing system, wherein the one and more locator units (L) are arranged in the construction site and the personal protective unit (H) and the gateway unit (G) are equipped by a worker for performing patrolling in the construction site, the method comprises steps of:

a) connecting the gateway unit with the personal protective unit of the worker;

b) getting and downloading a preset 2D and/or 3D patrol map or information of one or more checkpoints denoted by the one or more locator units and requirements for successful patrol in association with/for respective checkpoints from the server to the gateway unit;

c) locating and reaching respective checkpoints denoted by respective locator units and fetching respective requirements for respective checkpoints via the gateway unit;

d) performing patrolling based on the respective requirements until done and then notifying the server to update latest progress of the patrolling;

e) repeat steps c)-d) until all requirements for all checkpoints have been fulfilled and the latest progress of the patrolling have been updated by the server; and f) leaving the checkpoints and notifying the server the patrolling is done and disconnecting the gateway unit with the personal protective unit.

In some embodiments, the foregoing method as illustrated by the FIG. 4 might comprise one or more of the followings:

401. The gateway unit (G) will bind with personal protective unit (H) to obtain the information of the worker/personnel.

402. The gateway unit (G) will get the information from the 3D system.

403. When worker personnel with H and G approaches the checkpoint with denoted by Locator unit (L).

404. The gateway unit (G) will notify the 3D system that H is at the area of location unit (L)

405. The gateway unit (G) will fetch the L's requirement for the successful patrol.

406. The worker/personnel will check with check list in G, and L's requirement is satisfied.

407. If the requirement in L is not satisfied, the step 406 will be restarted. Otherwise, the worker/personnel can leave area of location unit (L).

408. The gateway unit (G) will notify the 3D system that H finished patrol in area of L and leaving area of L.

409. Gateway unit (G) will check with 3D system that any other check point need to patrol. If other check point need to go, steps from step 403 will be restarted.

410. Otherwise, gateway unit (G) will notify 3D system that the worker/personnel with H is finished all patrols.

411. Then gateway unit (G) will unbind with personal protective unit (H) and finish the process.

Figure 5:
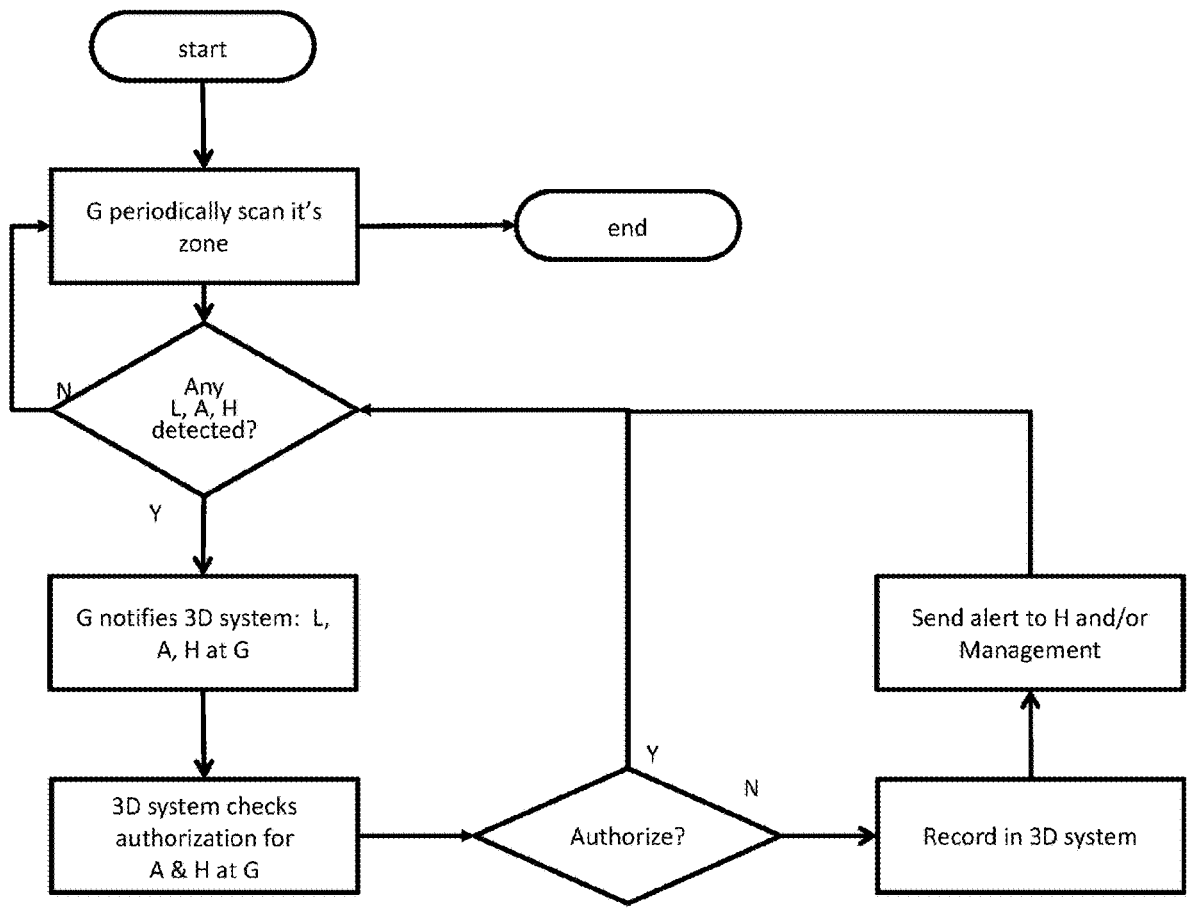
FIG. 5 is a flow chart of an example method of On-site Asset/Labour Verification and whereabouts determination of the present disclosure.

Referring to FIG. 5, which depicts a flow chart of a method for onsite asset and/or labour/personnel verification and whereabouts determination in a construction site adopting a foregoing system, wherein the one and more locator units are arranged in the construction site and/or arranged in an onsite asset as an asset locator unit (A) and the personal protective unit is equipped by a worker/personnel and the gateway unit is mounted at a fixed location in the construction site, the method comprises steps of:

a) having the gateway unit periodically scan its coverage area;

b) notifying the server, when the gateway unit sensed/detected the locator unit, the asset locator unit, and/or the personal protective unit, locations of each of detected locator unit, the asset locator unit, and/or the personal protective;

c) checking, by the server, positioning authorization of the asset locator unit, and/or the personal protective unit within the coverage area;

d) sending, if authorization is negative, alert to the personal protective unit and/or an entity in association with the onsite asset and recording and showing result of checking in the server.

In some embodiments, the foregoing method as illustrated by the FIG. 5 might comprise one or more of the followings:

501. The gateway unit (G) will periodically scan corresponding area zone until turn off the function.

502. The gateway unit (G) will detect any locator unit (L), asset locator unit (A) and worker/personnel with personal protective unit (H). If nothing detected, the step 1 will be repeated.

503. If gateway unit (G) detect the locator unit (L), asset locator unit (A) and worker/personnel with personal protective unit (H), gateway unit (G) will notify 3D system that locator unit (L), asset locator unit (A) and worker/personnel with personal protective unit (H) are located at area zone of gateway unit (G).

504. The 3D system will check the authorization for asset locator unit (A) and with personal protective unit (H) at area of gateway unit (G.).

505. If asset unit (A) and/or personal protective unit (H) are authorized, then steps from step 502 will be restarted.

506. Otherwise, it will make a record in the 3D system that un-authorization item in area of gateway unit (G).

507. Then an alert will be send to worker/personnel with personal protective unit (H) and/or management personnel. And then steps from step 502 will be restarted.

Figure 6:
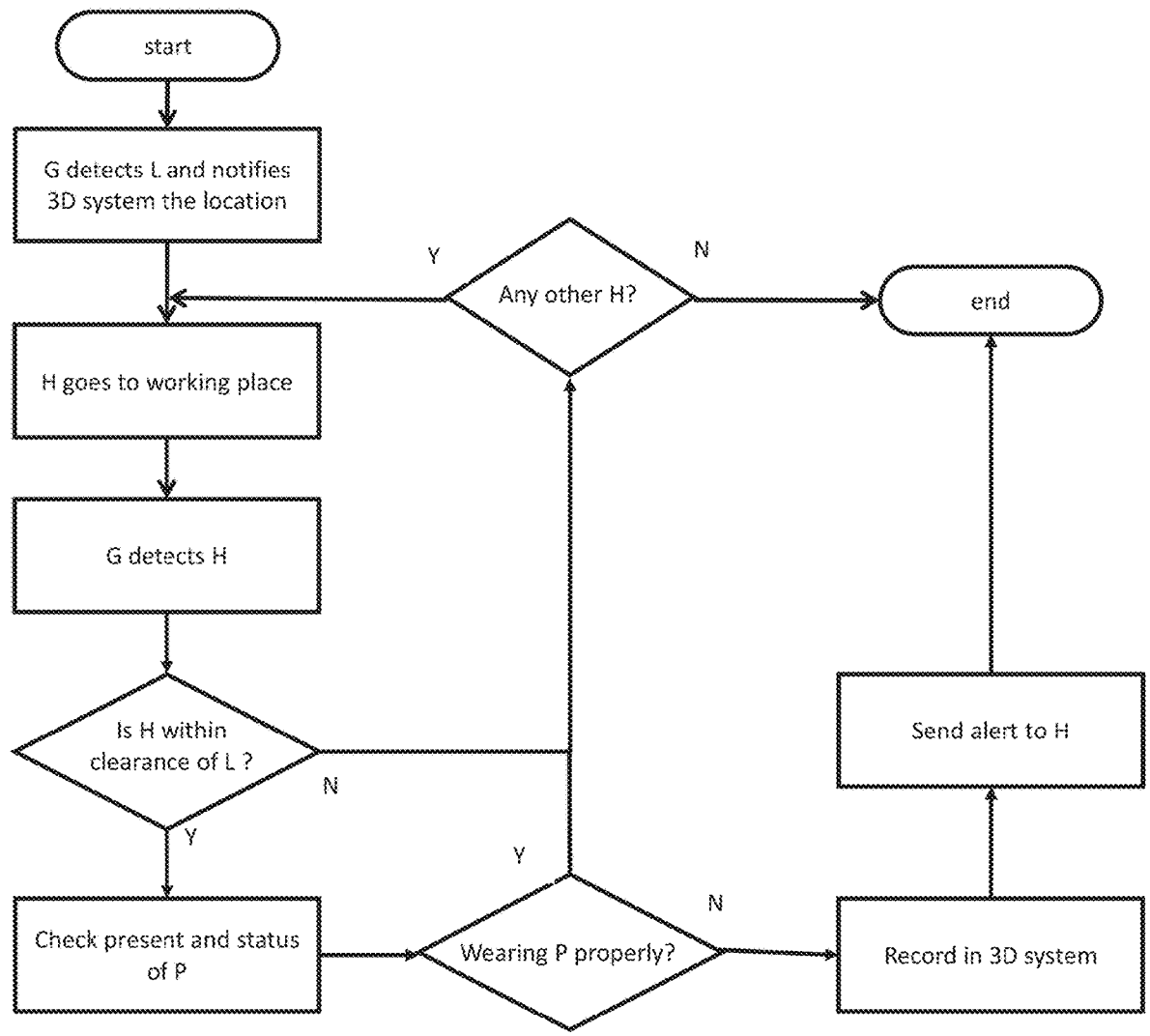
FIG. 6 is a flow chart of an example method of Location Aware PPE Checking of the present disclosure.

Referring to FIG. 6, which depicts a flow chart of a method for location aware checking of personal protective unit in a construction site adopting a foregoing system, wherein the one and more locator units (L) are arranged in the construction site and the personal protective unit (H, P) is equipped by a worker and the gateway unit is mounted at a fixed location in the construction site, the method comprises steps of:

a) having the gateway unit periodically scan its coverage area;

b) notifying to the server, when the gateway unit sensed/detected a locator unit, location of the detected locator unit;

c) acquiring from the server, a list of required/allowable types and/or status of personal protective unit and safety clearance in association with the location of the detected locator unit;

d) checking, when the gateway unit sensed/detected at least one personal protective units, whether types and/or status of the detected personal protective unit conforms to the list of allowable types and/or status and/or the detected personal protective unit is located within the safety clearance;

e) sending, if result of checking is negative, alert to the detected personal protective unit and recording and showing result of checking in the server.

In some embodiments, the foregoing method as illustrated by the FIG. 6 might comprise one or more of the followings:

601. The gateway unit (G) will detect locator unit (L) and report it to 3D system with the location information.

602. When the worker/personnel with personal protective unit (H) approach to a work space 603. Gateway unit (G) will detect worker/personnel with personal protective unit (H).

604. Gateway unit (G) will check worker/personnel with personal protective unit (H) is located within safety clearance of location unit (L). If it is in safety zone, then it will check for another worker/personnel with personal protective unit (H) in step 609.

605. Otherwise, gateway unit will check the present and the status of personal protective unit (P).

606. If the personal protective unit (P) is wear properly, then it will check for another worker/personnel with personal protective unit (H) in step 609.

607. If it is found that personal protective unit (P) is wear improperly, the gateway unit (G) will make a record into 3D system.

608. And an alert is send to worker/personnel with personal protective unit (H) for warning.

609. If another worker/personnel with personal protective unit (H) is detected, then steps from step 602 will be restarted, until function is turned off.

Figure 7:
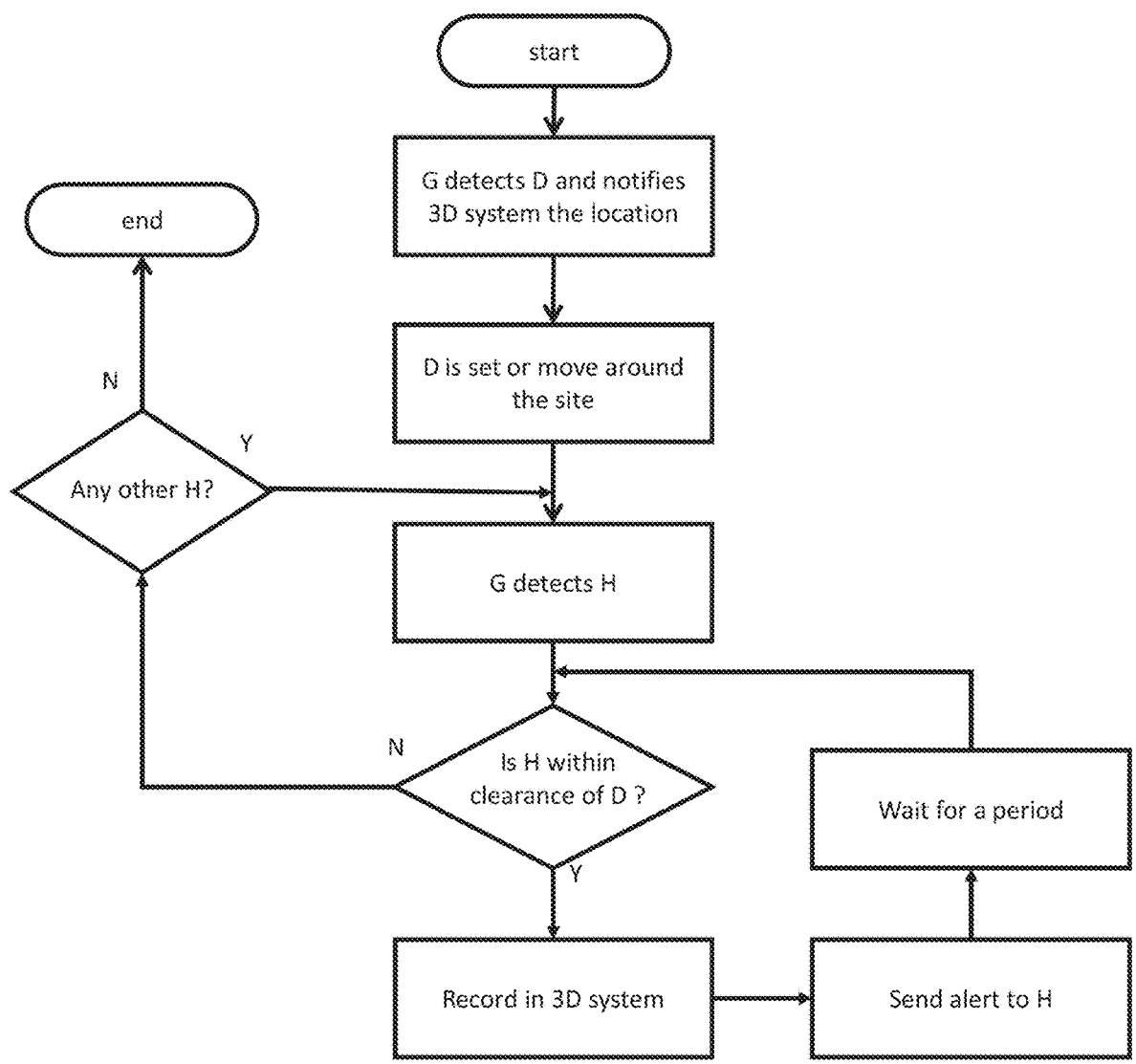
FIG. 7 is a flow chart of an example method of Active Safety Alert (2D) of the present disclosure.

Referring to FIG. 7, which depicts a flow chart of a method for providing an active safety alert in a construction site adopting a foregoing system, wherein a locator unit is arranged in the construction site as a deployable danger locator unit (D) mounted on a movable object for indication of a danger zone in association with the movable object and the personal protective unit (H) is equipped by a worker and the gateway unit (G) is mounted at a fixed location in the construction site, the method comprises steps of:

a) having the gateway unit periodically scan its coverage area;

b) notifying to the server, when the gateway unit sensed/detected a deployed danger locator unit, location of the detected danger locator unit;

c) acquiring from the server, a safety clearance in association with the danger locator unit and/or location of the detected locator unit;

d) sending, when the gateway unit sensed/detected a personal protective units and the detected personal protective unit is located within the safety clearance, an alert preferably from the gateway unit and/or the server to the detected personal protective unit and recording and showing the alert in the server until the detected personal protective unit is no longer located within the safety clearance.

In some embodiment, step d) might be replaced by or accompanied with step e) sending, when the gateway unit sensed/detected a personal protective units and the detected personal protective unit is located within the safety clearance, notification to the server on the presence of the detected personal protective unit and recording and showing the notification and keep tracking of location of the detected personal protective unit in the server when the detected personal protective unit remains to be located within the safety clearance; and sending an alert to the detected personal protective unit and recording and showing the alert in the server when the detected personal protective unit is about to leave, or no longer located within, the safety clearance.

In some embodiments, the movable object might be an automobile, a self-propelling machinery or a vehicle travelling in or passing by the work space/construction site; and/or a movable part of a machine, such as the arm/boom/jib, or various moving parts of a crane or any other machineries deployable in the work space/construction site and well known in the art. The danger locator unit is to alert people or devices to prevent collisions or accidents from occurring there between.

In some embodiments, the foregoing method as illustrated by the FIG. 7 might comprise one or more of the followings:

701. The gateway unit (G) will detect danger locator unit (D) and report it to 3D system with the location information.
702. Danger locator unit (D) is set or moving around the area of gateway unit (G).
703. Gateway unit (G) detect the worker/personnel with personal protective unit (H).
704. If worker/personnel with personal protective unit (H) is located within safety zone of danger locator unit (D), then it will check for another worker/personnel with personal protective unit (H) in step 708.
705. If worker/personnel with personal protective unit (H) is within danger zone of danger locator unit (D), it will make a record in the 3D system.
706. And the alert will send to worker/personnel with personal protective unit (H) as warning.
707. Wait for a period, then repeat steps from step 704.
708. If any other worker/personnel with personal protective unit (H) approaches danger locator unit (D), the steps from step 703 are restarted until function turn off.

Figure 8:
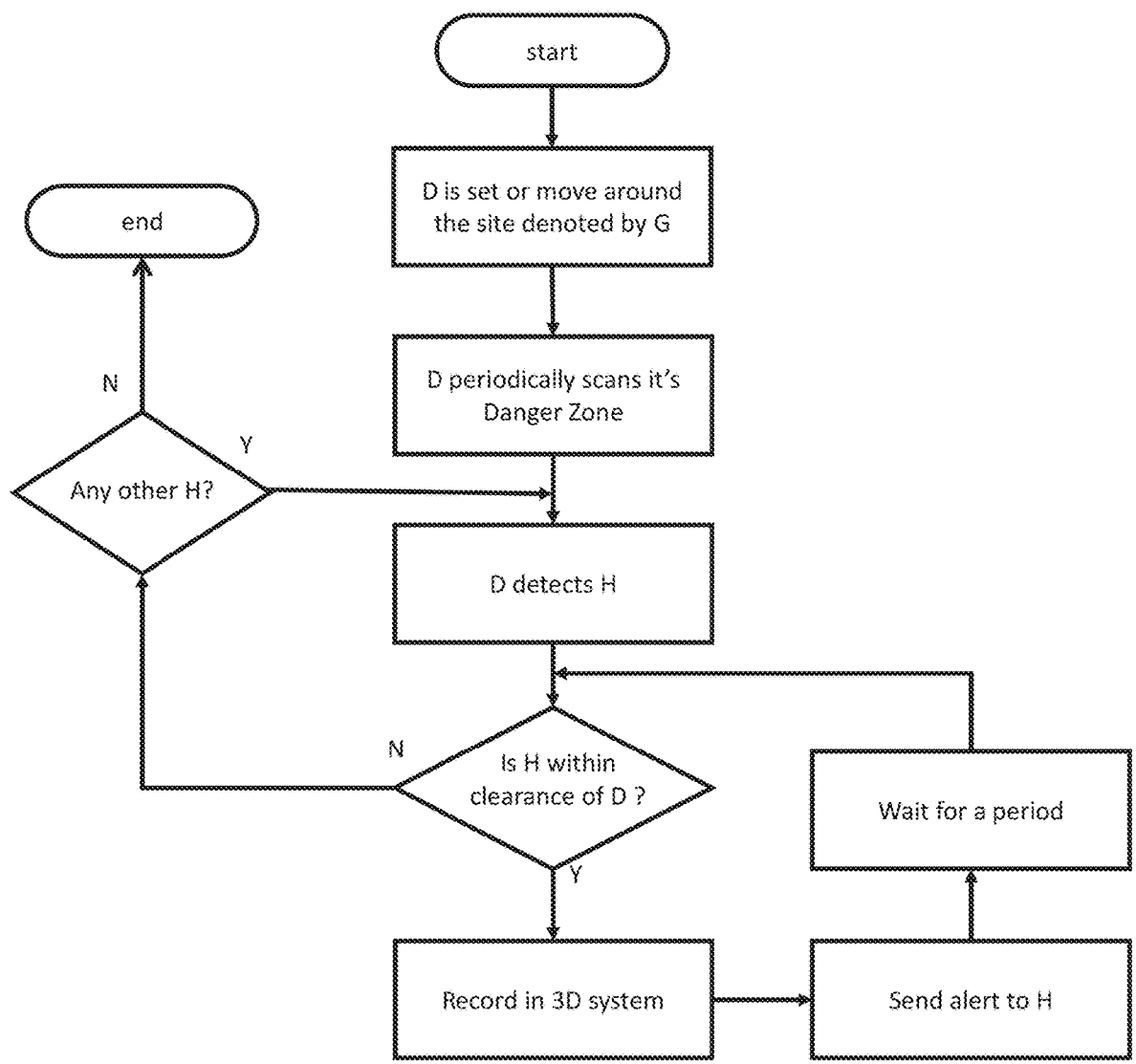
FIG. 8 is a flow chart of an example method of Active Safety Alert (3D) of the present disclosure.

Referring to FIG. 8, which depicts a flow chart of a method for providing an active safety alert in a construction site adopting a foregoing system, wherein a locator unit is incorporated with a gateway unit or have capabilities of a gateway unit and arranged in the construction site as a deployable active danger locator unit (D) for indication of a configurable danger zone and the personal protective unit (H) is equipped by a worker and a gateway unit (G) is mounted at a fixed location in the construction site, the method comprises steps of:

a) having the active danger locator unit set or move around a location or site obtained from and denoted by a gateway unit, wherein the location or site is assigned as the danger zone with a preset safety clearance;
b) having the active danger locator unit periodically scan its coverage area;
c) sending, when the active danger locator unit sensed/detected a personal protective units and the detected personal protective unit is located within the safety clearance, an alert preferably from the active danger locator unit to the detected personal protective unit and recording and showing the alert in the server until the detected personal protective unit is no longer located within the safety clearance.

In some embodiment, step c) might be replaced by or accompanied with step d) sending, when the active danger locator unit sensed/detected a personal protective units and the detected personal protective unit is located within the safety clearance, notification to the server on the presence of the detected personal protective unit and recording and showing the notification and keep tracking of location of the detected personal protective unit in the server when the detected personal protective unit remains to be located within the safety clearance; and sending an alert preferably from the active danger locator unit to the detected personal protective unit and recording and showing the alert in the server when the detected personal protective unit is about to leave, or no longer located within, the safety clearance.

In some embodiments, the foregoing method as illustrated by the FIG. 8 might comprise one or more of the followings:

801. Danger locator unit (D) is set or moving around the area zone which denoted by gateway unit (G).
802. Danger locator unit (D) scans corresponding danger zone periodically.
803. Danger locator unit (D) detects worker/personnel with personal protective unit (H) approaching.
804. If the worker/personnel with personal protective unit (H) is within safety zone of danger locator unit (D), then it will check for another worker/personnel with personal protective unit (H) in step 808.
805. If worker/personnel with personal protective unit (H) is within danger zone of danger locator unit (D), it will make a record in the 3D system.
806. And the alert will send to worker/personnel with personal protective unit (H) as warning.
807. Wait for a period, then repeat steps from 804.
808. If any other worker/personnel with personal protective unit (H) approaches danger locator unit (D), the steps from step 803 are restarted until function turn off.

Features set out in the claims hereto (jointly and severally where appropriate) are to form part of this disclosure and are incorporated herein by reference.

While various examples or embodiments have been described herein, it should be appreciated that they are for illustration and are not for scope restriction. It should be appreciated that portions or parts of the various example embodiments can be excerpted for combination and/or mix-and-match where appropriate to form other variants without loss of generality.

The invention claimed is:

1. A location based quality assurance system, comprising:
one or more locator units, preferably in form of a stand-alone fastener and/or a removable device mountable at a designated indoor/outdoor position, with a preset or configurable locator data/first positioning data, and/or at least one sensor, and capable of broadcasting/providing the locator/first positioning data by wireless transmissions and preferably by mobile wireless transmissions for provision of a 2 Dimensional (2D) and/or 3 Dimensional (3D) geo-tagging reference for positioning/indoor positioning of an external device within a predetermined coverage, the one or more locator units arranged in a work space;
at least one movable and wearable personal protective unit, preferably in form of a safety helmet, a welding mask, a spray mask, a smoke mask, a dusk mark, a fire mask, a protective mask, a protective boot, a protective suit, a protective glove, a protective glass, an anti-noise headphone, a safety belt, a safety vest, and/or a full body harness, with at least one sensor and alert/status indicator for checking/receiving and indicating an operation or status or alert on at least one part of the personal protective unit and capable of broadcasting/providing Global Positioning System (GPS)/second positioning data by wireless transmissions and preferably by mobile wireless transmissions for provision of a location aware checking reference for an external device within a predetermined coverage, each of the at least one movable and wearable personal protective unit adapted to be equipped by a worker for dealing with a defect existed in the work space that needs to be corrected;

at least one gateway unit, preferably in form of a portable electronic device, a smartphone, a handheld computer, and/or a detachable device pluggable to a building fixture readily found on site, operatively connected to the locator unit and the personal protective unit, and adapted to receive the locator/first positioning data and the GPS/second positioning data and/or the references and compute a combined/third positioning data for generation of a location based output denoting a location of a defect and incorporating details of the defect; and control the sensor and indicator based on the locator data and the positioning data; and send the location based output generated based on the locator/first positioning data, the second positioning data and/or the third positioning data to an external remote and preferably cloud server for further processing wherein the server is configured to operatively connected to and communicate with the locator unit and the personal protective unit and the gateway unit, so as to enable direct or indirect remote manipulation or control of the first, second or third positioning data, the sensor of the locator unit when present, the sensor of the personal protective unit, the indicator, and/or the location based output, wherein the direct or indirect remote manipulation or control comprises:

a) connecting a first gateway unit with a first personal protective unit of a first worker assigned for site exploration and defect capture to acquire the GPS/second positioning data;

b) connecting, when a defect is found, the first gateway unit with a first locator unit located nearby the defect to acquire the locator/first positioning data;

c) recording details of the defect with the first gateway unit and generating and sending a respective location based output denoting a location of the defect and incorporating the details of the defect to the server;

d) repeating steps b)-c) until all defects existed in the work space have been recorded and received by the server;

e) connecting a second gateway unit with a second personal protective unit of a second worker assigned for defect tracking, processing and verification;

f) getting and downloading the respective location based output from the server to the second gateway unit for locating and reaching the respective locator unit and/or the respective defect to allow the respective defect to be processed or verified;

g) recording latest processing result and/or status data of the respective defect with the second gateway unit and sending recorded data to the server which updates latest status of recorded defects; and h) repeating steps f)-g) until all defects have been processed or verified and updated by the server.

2. A system of claim 1, wherein the locator unit is configured to comprise a sensor and/or a device for detecting proximity of the personal protective unit and/or the gateway unit and to send actively an alert message to each of the detected personal protective unit and/or the gateway unit to notify them existence of a hidden danger and/or need of keeping a specific distance from a designated zone/area.

3. A system of claim 1, wherein the one or more locator units and/or the at least one gateway unit are arranged to be aligned substantially along a length direction, a width direction, and/or a height direction of a site, a structure, or a building in which the locators units are mounted, so as to establish a 2D (including xy, yz, zx planes)/3D (including xyz plane) Geo-tagging system to enable provision of 2D/3D positioning data.

4. A system of claim 1, wherein the locator units is configured to be weather proof and powered by an internal chargeable battery and/or an external power source, and support wireless transmissions and preferably mobile wireless transactions and iBeacon and/or EddyStone protocol, and comprise a plurality of sensors for sensing temperature, lighting, specific chemical and/or gas concentration, movement, and/or proximity of surrounding environment or objects.

5. A method for collecting data in relation to locations, environment conditions, time, workers/personnel and behaviours in a work space by adopting a system of claim 1; wherein data are collected and transmitted thru wireless machine to machine interactions of locator units, mobile and/or installed sensors and gateways, and personal protective equipment with detachable or built-in sensors; and collected data are wirelessly transmitted to the remote server for timely or real time work process administration and/or big data analysis in order to enhance effective communication and management of safety, work flow, work forces, worker/personnel attendance and projects in the work space; the method comprises steps of:

a) arranging a plurality of first locator units with respective preassigned device ID in predetermined locations in the work space to form a 2D and/or 3D network for provision of a 2D and/or 3D geo-tagging reference for positioning by broadcasting positioning data of 3D coordinates;

b) equipping each of workers with a preassigned personal protective unit with a preset device ID and capable of acquiring and broadcasting positioning data of 2D coordinates and/or a preassigned gateway unit with respective preassigned device ID capable of computing a combined positioning data for generation of a location based output based on the positioning data of 3D coordinates acquired from each of nearby and detected locator units and the positioning data of 2D coordinates acquired from each of nearby and detected personal protective units and sending the location based output to a remote server for timely or real time work process administration and/or big data analysis;

c) arranging a plurality of first gateway units with respective preassigned device ID fixedly in predetermined locations in the work space to interact with each of the nearby and detected locator units, personal protective unit and gateways arranged at respective workers and sending data acquired from them and/or generated during interaction with them to the remote server for timely or real time work process administration and/or big data analysis;

d) arranging at least one second locator unit having a preassigned device ID and incorporated with a gateway unit or have capabilities of a gateway unit in predetermined locations in the work space as a deployable active danger locator unit for indication of a configurable danger zone with a preset and/or configurable safety clearance, wherein the active danger locator unit periodically scan its coverage area and sends, when it detected a personal protective units and/or a gateway unit equipped by a worker and the detected personal protective unit and/or the gateway unit being approached to or located within the safety clearance, alert directly to the detected personal protective unit and/or the gateway unit and the alert is preferably also recorded and showed in the server until the detected personal protective unit and/or the gateway unit equipped by the worker being no longer located within the safety clearance.

6. A method for patrolling in a work space adopting a system of claim 1, wherein the one and more locator units are arranged in the work space and the personal protective unit and the gateway unit are equipped by a worker for performing patrolling in the work space, the method comprises steps of:
 a) connecting the gateway unit with the personal protective unit of the worker;
 b) getting and downloading a preset 2D and/or 3D patrol map or information of one or more checkpoints denoted by the one or more locator units and requirements for successful patrol in association with/for respective checkpoints from the server to the gateway unit;
 c) locating and reaching respective checkpoints denoted by respective locator units and fetching respective requirements for respective checkpoints via the gateway unit;
 d) performing patrolling based on the respective requirements until done and then notifying the server to update latest progress of the patrolling;
 e) repeat steps c)-d) until all requirements for all checkpoints have been fulfilled and the latest progress of the patrolling have been updated by the server; and
 f) leaving the checkpoints and notifying the server the patrolling is done and disconnecting the gateway unit with the personal protective unit.

7. A method for onsite asset and/or labour verification and whereabouts determination in a work space adopting a system of claim 1, wherein the one and more locator units are arranged in the work space and/or arranged in an onsite asset as an asset locator unit and the personal protective unit is equipped by a worker and the gateway unit is mounted at a fixed location in the work space, the method comprises steps of:
 a) having the gateway unit periodically scan its coverage area;
 b) notifying the server, when the gateway unit sensed/detected the locator unit, the asset locator unit, and/or the personal protective unit, locations of each of detected locator unit, the asset locator unit, and/or the personal protective;
 c) checking, by the server, positioning authorization of the asset locator unit, and/or the personal protective unit within the coverage area;
 d) sending, if authorization is negative, alert to the personal protective unit and/or an entity in association with the onsite asset and recording and showing result of checking in the server.

8. A method for location aware checking of personal protective unit in a work space adopting a system of claim 1, wherein the one and more locator units are arranged in the work space and the personal protective unit is equipped by a worker and the gateway unit is mounted at a fixed location in the work space, the method comprises steps of:
 a) having the gateway unit periodically scan its coverage area;
 b) notifying to the server, when the gateway unit sensed/detected a locator unit, location of the detected locator unit;
 c) acquiring from the server, a list of required/allowable types and/or status of personal protective unit and safety clearance in association with the location of the detected locator unit;
 d) checking, when the gateway unit sensed/detected at least one personal protective units, whether types and/or status of the detected personal protective unit conforms to the list of allowable types and/or status and/or the detected personal protective unit is located within the safety clearance;
 e) sending, if result of checking is negative, alert to the detected personal protective unit and recording and showing result of checking in the server.

9. A method for providing an active safety alert in a work space adopting a system of claim 1, wherein a locator unit is arranged in the work space as a deployable danger locator unit mounted on a movable object for indication of a danger zone in association with the movable object and the personal protective unit is equipped by a worker and the gateway unit is mounted at a fixed location in the work space, the method comprises steps of:
 a) having the gateway unit periodically scan its coverage area;
 b) notifying to the server, when the gateway unit sensed/detected a deployed danger locator unit, location of the detected danger locator unit;
 c) acquiring from the server, a safety clearance in association with the danger locator unit and/or location of the detected locator unit;
 d) sending, when the gateway unit sensed/detected a personal protective units and the detected personal protective unit is located within the safety clearance, an alert to the detected personal protective unit and recording and showing the alert in the server until the detected personal protective unit is no longer located within the safety clearance.

10. A method for providing an active safety alert in a work space adopting a system of claim 1, wherein a locator unit is incorporated with a gateway unit or have capabilities of a gateway unit and arranged in the work space and/or mounted on a movable or mobile object as a deployable active danger locator unit for indication of a configurable danger zone and the personal protective unit is equipped by a worker and a gateway unit is mounted at a fixed location in the work space, the method comprises steps of:
 a) having the active danger locator unit set or move around a location or site obtained from and denoted by a gateway unit, wherein the location or site is assigned as the danger zone with a preset and/or configurable safety clearance;
 b) having the active danger locator unit periodically scan its coverage area;
 c) sending, when the active danger locator unit sensed/detected a personal protective units and the detected personal protective unit is located within the safety clearance, an alert from the active danger locator unit to the detected personal protective unit and recording and showing the alert in the server until the detected personal protective unit is no longer located within the safety clearance.

* * * * *